United States Patent Office 3,448,360
Patented June 3, 1969

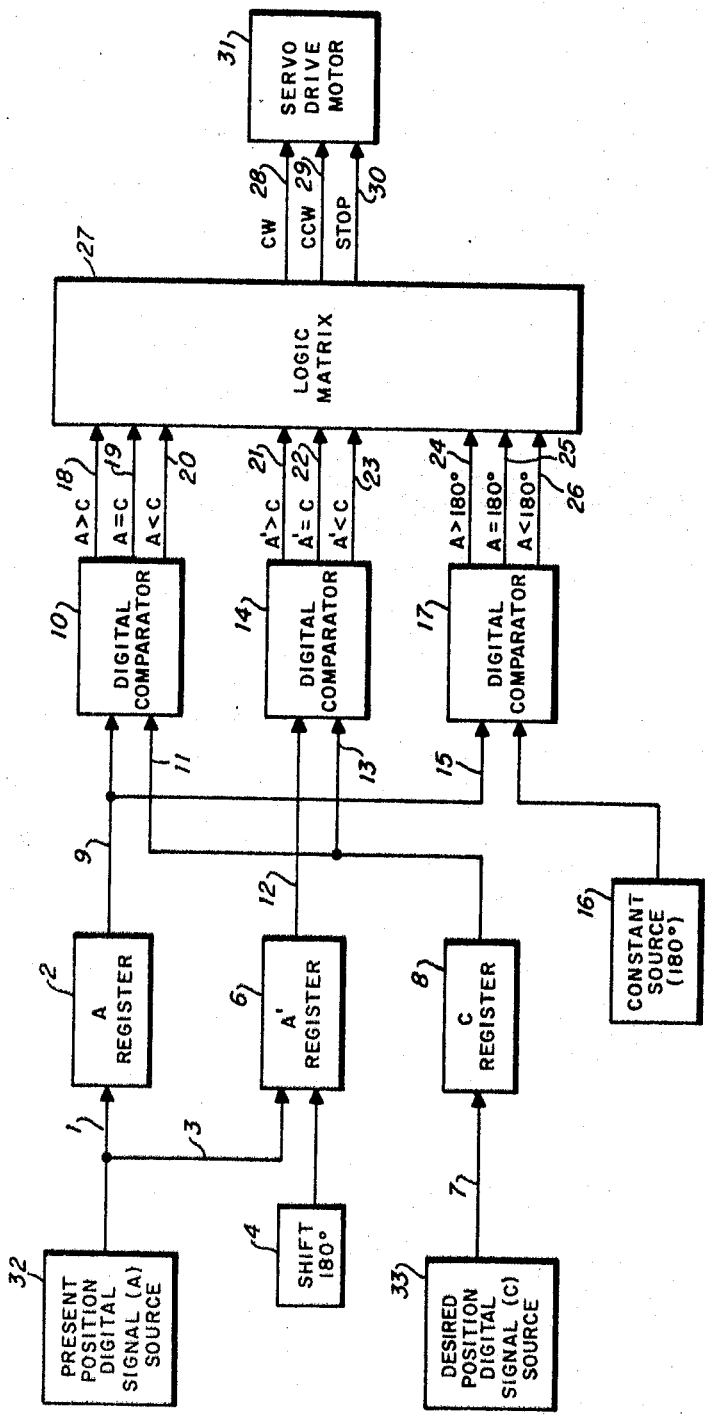

3,448,360
DIGITAL SERVOMOTOR POSITION CONTROL INCLUDING MEANS TO POSITION IN SHORTEST DIRECTION
James E. Pohl, San Diego, Calif., assignor to the United States of America as represented by the Secretary of the Navy
Filed Oct. 19, 1965, Ser. No. 498,171
Int. Cl. G05b 11/01
U.S. Cl. 318—28         1 Claim

ABSTRACT OF THE DISCLOSURE

A system for rotating an antenna from a present direction to a desired direction includes logic circuitry ensuring the shorter direction of rotation that includes three registers receiving digital signals representative of the antenna's present direction, a direction rotated 180° from the present direction, and a desired direction. Outputs from the registers are passed to three comparators for comparison between pairs of the representative signals to determine if one signal is greater than, equal to, or less than the other signal and a final signal is fed to a logic matrix driving an antenna rotating motor to the desired position.

---

The invention described herein may be manufactured and used by or for the Government of the United States of America for governmental purposes without the payment of any royalties thereon or therefor.

The present invention relates to a servo-drive-sense control system and more particularly to a servo-drive-sense control system utilizing digital techniques.

Servomotors have a multitude of different applications in the electronic and mechanical arts. They may be used to control the positioning of a wide variety of objects. The instant servo system is particularly related to situations where it is necessary to alter the angular position of the servo in a minimum amount of time.

Whenever it is desired to rotate a servomotor from one present angular position to a new command angular position, obviously two angular paths are available. One path is less than 180° and the other greater than 180°. Various systems have been developed in the prior art to determine which direction the servo should drive in order to reach its new command position in the shortest angular distance. The prior art systems utilize analog voltages representing present position and command position and by arithmetic operations, involving difference amplifiers, etc., the proper direction of rotation is determined.

In modern applications utilizing such servo drive mechanisms, command signals, representative of a desired shaft position, are usually presented in digital form from the outputs of computers and similar equipment. Likewise, present position signals are often presented in digital form from digital shaft position indicators. To utilize the prior art drive-sense determining equipment in such modern systems requires that the digital signals presented be first converted to their analog equivalents before being fed to the analysis circuitry.

The present invention obviates the need for the digital-to-analog converters required by the prior art by providing a drive-sense determining system which utilizes digital logic techniques and hence accepts the digital present position and command signals, representative of a desired position, without need for conversion.

An object of the present invention is to provide apparatus for determining drive sense in a servomotor system.

Another object of the present invention is to provide apparatus using digital techniques for determining drive sense in a servomotor control system.

A further object of the present invention is to provide a drive-sense servo control system which is capable of accepting command input signals in digital form thus obviating the need for digital-to-analog converters.

The system of the present invention basically operates by performing logical operations upon a command signal representing a desired shaft position, a present position signal and a third signal representing present position plus a fixed reference, to wit 180°. By making comparisons only (not additions or subtractions) between these three variables, the drive sense for shortest drive time may be made without ambiguity. Each comparison in a separate comparator provides three mutually exclusive outputs, e.g., a first signal is greater than a second, a first signal is less than a second, or a first signal is equal to a second. The resulting output from each of the comparators is then combined in a drive sense logic matrix to develop the final drive sense command.

The above and other objects and features of the invention will be more fully understood from the following detailed description and accompanying drawing wherein the figure is a block diagram of the overall system. The data signals originate from a source 32 representing a shaft's actual present position and a source 33 representing a command or shaft's desired position. Encoding of the signals from either source can be in accordance with any well known coding technique; for example, one digit bit could represent one angular degree. In the following description, for the sake of simplicity, a series of data representative of the shaft's actual present position will be referred to as data "A" and data representative of a shaft's desired position or command data will be referred to as data "C."

The figure represents an elementary block diagram of an embodiment of the present invention. Input present position data A, from source 32, enters the system along line 1 and is stored in register 2. Similarly A data on line 1 passes over line 3 to register 6. Shifting means 4 functions to operate on the digital data in register 6 and increase its angular value by 180°. Command data, or desired position data, C, from source 33, enters the system over line 7 and passes on to be stored in register 8. A data, when increased by 180°, is indicated as A data as can be seen in the drawing.

In one actual embodiment shifter 4 was a counter which advanced the A count in register 6 by a number of digital steps equivalent to an angular value of 180°.

When data is ready in registers 2, 6 and 8 it is shifted out to the comparison circuitry by a shifting signal or by being passed after a predetermined time delay since, by definition, a register is computer hardware for storing one word of data for subsequent logic operations. The shifting signal inputs to registers 2, 6 and 8 have not been shown in order to simplify the drawing. Furthermore it should be noted that the digital data referred to may be in parallel form and in actuality then each of the registers would have a plurality of parallel inputs and outputs. A data from register 2 is shifted out over line 9 to comparator 10 where it is compared with C data from register 8 arriving on line 11. Similarly A' data and C data are fed over lines 12 and 13, respectively, to comparator 14. Comparator 17 is presented with A data line 15 and a 180° reference signal from constant source 16.

Each of comparators 10, 14 and 17 has three mutually exclusive outputs. A first output is present if a first input is greater than a second input. A second output is present if a first input equals a second input. A third output is present when a first input is less than a second input. It is therefore apparent that if A is greater than C, a signal appears on line 18; if A equals C, a signal appears on line 19; and if A is less than C, a signal is present on line 20. Similarly if A' is greater than C, an output appears on line 21; if A' equals C, an output appears on line 22; and if A' is less than C, an output appears on line 23. It similarly follows that if A is greater than 180°, an output is present on line 24; if A equals 180°, an output is present on line 25; and if A is less than 180°, an output is on line 26. Any signals present on lines 18 through 26 are fed to diode logic matrix 27.

A matrix, by definition, performs the functions of encoding or decoding data to produce a representative output signal. The configuration of such a matrix is determined by the logical functions desired and the nature of the incoming signals. In the instant invention, an output signal indicating one of three functions is desired, viz., counterclockwise rotation, clockwise rotation, and no rotation of the shaft. The clockwise, counterclockwise and stop signals from matrix 27 are fed via lines 28 to 30, respectively, to servo drive mechanism 31.

The following table illustrates the input condition which must exist at matrix 27 for each of the outputs to occur.

|   | Input Conditions |   |   | Output |
|---|---|---|---|---|
| C<A J C≧A' | C<A KC<A' A<180° | C>A L C>A' A<180° |   | CCW |
| C>A M C≦A' | C<A NC<A' A>180° | C>A O C>A' A≧180° |   | CW |
| P |   | C=A |   | Stop |

The novel features of the invention, requiring a comparison of data signals representative of an actual azimuth to data signals representative of 180°, ensures the shortest angular travel of the servo driven shaft to a desired azimuth, are best set forth by examining the following examples. If, for the purposes of explanation, one bit of data equals one degree, then numerically, C data can be said to have a greater or numerical lesser value than A data or vice versa. In condition J, set out in the above table, let C data representing a desired angular position of a shaft, equal 40°. Let A data, representing an actual angular position of the shaft, equal 200°. Data A', therefore, equals an angle of 20° (200°+180°=380° or 20°). Comparator 10 will give an output over line 18 showing that C is less than A. Comparator 14 will give an output on line 23 indicating that C is greater than A' and the shaft will rotate the shortest angular distance in a counterclockwise direction. Condition M exists if data C represented 270°, data A represented 170°, and data A' represented 350°. Comparator 10 will pass an output signal on line 20 representing C being greater than A and comparator 14 will give an output over line 21 indicating C being less than A' and the matrix will transfer an output signal to the drive motor for clockwise rotation, this being the shortest angular distance between the actual angular position and the desired angular position.

The unique purpose, operation, and circuit interrelation of the constant source 16 and its associated comparator 17 with the aforementioned comparators 10 and 14 are readily apparent in the following examples. If C data represents 20° and A data represents an actual angular positioning of a shaft at 170°, A' has the value of 350°. C data is less in magnitude to both A data and A' data. Digital comparator 17, compares the magnitude of A data to 180° and an output signal on line 26 is passed to the logic matrix indicating that A is less than 180°. As shown in the table above, condition K exists with C less than A, A', and 180°, and causes an output on line 29 to drive the servo drive motor in a counterclockwise direction to effect the shortest angular displacement of the shaft. In another example, assuming that C data is 20°, A data is 350°, and A' data is 170°, it will be noted that C data is less than A data, less than A' data, but A is data representative of an angle greater than 180°. Therefore, the condition shown by condition N is met and clockwise angular displacement of the shaft results. Similarly, the conditions for condition L and condition O are met when the data C is greater than A data or A' data with the value of A being greater or less than 180°.

When condition P exists, C data equals A data, an output signal from comparator 10 on line 19 passes through the matrix and the stop signal is passed on line 30 to the servo drive motor.

A variety of particular circuits could be used to implement the functions represented by clocks in the block diagram and consequently the particular circuitry has not been shown in the drawing. By reference to such a text as Wiley, 1958, "Logical Design of Digital Computers," by Montgomery Phister, Jr., a person with ordinary skill in the digital systems could implement the various functions needed. For example, the construction of the diode logic matrix 27 becomes obvious when reference is made to pages 21–25 of the aforementioned text.

The particular sense control system has been successfully used in conjunction with a rotating radio telescope but, of course, its utility is not limited to such a particular application.

The instant invention can, therefore, be seen to provide a suitable solution to the problem of providing a servo-sense-control system which operates directly on digital input signals. While the invention has been described by means of a specific example and in a specific embodiment, it is not limited thereto, for obvious modifications will occur to those skilled in the art without departing from the spirit and scope of the invention.

What is claimed is:

1. In a servomechanism control system, apparatus for determining the quickest drive direction of a servomotor in response to a digital signal indicative of the present angular position of said servomotor and another digital signal indicative of a new desired angular position of said motor comprising:
    a servo drive motor capable of rotation in either of two directions,
    a first source of digital signals indicative of the present angular position of said servomotor,
    a second source of digital signals indicative of a new desired angular position of said servomotor,
    first, second and third registers for receiving and storing digital signals, said first and second registers being adapted to receive signals from said first source, said third register being adapted to receive signals from said second source,
    shifting means connected to said second register for altering the digital value of data stored in said second register by an amount indicative of an angular value of 180°,
    first, second and third digital comparators adapted to receive and compare relative digital values of pairs of signals,
    said first comparator being adapted to receive and compare signals from said first and third registers,
    said second comparator being adapted to receive and compare signals from said second and third registers,
said third comparator being adapted to receive and compare signals from said first register and a signal from a constant source,
said signal from said constant source having a digital value representative of an angular magnitude of 180°,
each of said comparators being adapted to compare its respective inputs and produce an output indicative of the results of said comparisons,
said comparator outputs being indicative of whether one received signal is equal to, greater than or lesser than the other received signal,
a logic matrix adapted to receive output signals from all of said comparators and responsive to certain combinations of said output signals to produce an output indicative of the proper drive direction for said servomotor,
means coupling said output from said matrix to said drive motor whereby said motor is caused to be driven to the new desired position via the shortest angular path.

References Cited

UNITED STATES PATENTS

| | | |
|---|---|---|
| 2,954,165 | 9/1960 | Myers. |
| 3,045,157 | 7/1962 | Jacquet et al. |
| 3,333,089 | 7/1967 | Saylor et al. |

BENJAMIN DOBECK, *Primary Examiner.*

T. E. LYNCH, *Assistant Examiner.*

U.S. Cl. X.R.

318—30